US012437618B2

(12) United States Patent
Gwak et al.

(10) Patent No.: US 12,437,618 B2
(45) Date of Patent: Oct. 7, 2025

(54) DEVICE FOR PROVIDING TACTILE STIMULATION

(71) Applicant: BHAPTICS INC., Daejeon (KR)

(72) Inventors: Ki Uk Gwak, Daejeon (KR); Young Joo Jo, Seoul (KR); Ki Yong Choi, Gyeonggi-do (KR)

(73) Assignee: BHAPTICS INC., Daejeon (KR)

( * ) Notice: Subject to any disclaimer, the term of this patent is extended or adjusted under 35 U.S.C. 154(b) by 0 days.

(21) Appl. No.: 18/707,171

(22) PCT Filed: Nov. 23, 2021

(86) PCT No.: PCT/KR2021/017221
§ 371 (c)(1),
(2) Date: May 3, 2024

(87) PCT Pub. No.: WO2023/080314
PCT Pub. Date: May 11, 2023

(65) Prior Publication Data

US 2025/0022353 A1 Jan. 16, 2025

(30) Foreign Application Priority Data

Nov. 8, 2021 (KR) ........................ 10-2021-0152593

(51) Int. Cl.
*A41D 19/00* (2006.01)
*G08B 6/00* (2006.01)

(52) U.S. Cl.
CPC ........... *G08B 6/00* (2013.01); *A41D 19/0024* (2013.01)

(58) Field of Classification Search
CPC ............ A41D 19/0024; A41D 19/0006; A41D 19/001; A41D 19/0013; A41D 19/0017;
(Continued)

(56) References Cited

U.S. PATENT DOCUMENTS 4,613,139 A * 9/1986 Robinson, II ........... G06F 3/014
D14/414
11,209,904 B2 12/2021 Gwak et al.
(Continued)

FOREIGN PATENT DOCUMENTS

CN 105902283 A 8/2016
CN 107927950 A * 4/2018 ......... A41D 19/0024
(Continued)

OTHER PUBLICATIONS

Manus Offices, Manus | Finger and Full-body tracking for Mocap and VR, 2023 Manus Meta., https://www.manus-vr.com.
(Continued)

*Primary Examiner* — Amy Vanatta
(74) *Attorney, Agent, or Firm* — Innovation Counsel LLP

(57) ABSTRACT

A tactile stimulation provision device in the form of a glove according to one embodiment of the present invention includes a first fabric in the form of a glove, a second fabric having a shape covering a hand back portion and finger upper portions of the first fabric by extending from the finger upper portions to fingerprint portions of the first fabric, fixing patches covering fingerprint portions of the second fabric and having first openings, and actuators inserted into the first openings and fixed between the fixing patches and the second fabric.

11 Claims, 13 Drawing Sheets

(58) Field of Classification Search
CPC ................ A41D 19/02; A41D 19/0082; A41D 19/01594; G08B 6/00; G06F 3/014; G06F 3/011; G06F 3/01; G06F 3/016; G06F 3/017; G06F 1/163; A61B 2034/741; A61B 2562/164; A61B 5/6806; A61B 5/6825; A61B 5/6826
USPC ............................. 2/163, 159, 160, 164, 169
See application file for complete search history.

(56) References Cited

U.S. PATENT DOCUMENTS

| | | | | |
|---|---|---|---|---|
| 11,606,987 | B2 * | 3/2023 | Phillips | A41D 19/0024 |
| 2006/0221066 | A1 * | 10/2006 | Cascella | G06F 3/03545 345/179 |
| 2009/0000010 | A1 * | 1/2009 | Sunder | A41D 19/01547 2/163 |
| 2011/0016609 | A1 * | 1/2011 | Phelps | A41D 19/0024 2/163 |
| 2014/0313022 | A1 * | 10/2014 | Moeller | G08B 6/00 340/407.1 |
| 2015/0123774 | A1 | 5/2015 | Ioffreda et al. | |
| 2017/0303853 | A1 * | 10/2017 | McMillen | A61B 5/6843 |
| 2018/0335841 | A1 * | 11/2018 | Rubin | G06F 3/0233 |
| 2018/0335842 | A1 * | 11/2018 | Rubin | G06F 3/0233 |
| 2019/0199069 | A1 * | 6/2019 | Johnson | C22C 19/03 |
| 2019/0357771 | A1 * | 11/2019 | Yu | A61N 5/0613 |
| 2020/0326780 | A1 * | 10/2020 | Kearney | G06F 3/04815 |
| 2021/0020003 | A1 * | 1/2021 | Yonehara | H10N 30/802 |

FOREIGN PATENT DOCUMENTS

| | | | | | |
|---|---|---|---|---|---|
| CN | 108415575 | A | * | 8/2018 | G06F 3/014 |
| CN | 109521876 | A | * | 3/2019 | G06F 3/014 |
| CN | 210605634 | U | | 5/2020 | |
| CN | 113625875 | A | * | 11/2021 | |
| DE | 102010024124 | A1 | * | 12/2011 | A41D 19/0024 |
| JP | 2008-276664 | A | | 11/2008 | |
| KR | 101068809 | B1 | * | 10/2011 | |
| KR | 20120023303 | A | * | 3/2012 | |
| KR | 10-1845018 | B1 | | 4/2018 | |
| KR | 10-2019-0031735 | A | | 3/2019 | |
| KR | 10-2019-0036167 | A | | 4/2019 | |
| KR | 10-2157904 | B1 | | 9/2020 | |
| WO | WO-2016189372 | A2 | * | 12/2016 | A63F 13/20 |
| WO | WO-2017114487 | A1 | * | 7/2017 | G06F 3/01 |

OTHER PUBLICATIONS

International Search Report for the International Application No. PCT/KR2021/017221 issued by the International Searching Authority (Korean Intellectual Property Office) on Jul. 20, 2022.

* cited by examiner

DEVICE FOR PROVIDING TACTILE STIMULATION

TECHNICAL FIELD

The present invention relates to a tactile stimulation provision device.

BACKGROUND ART

A tactile stimulation provision device includes actuators and may provide tactile stimulation to a user by selectively vibrating the actuators. The tactile stimulation provision device may be provided to fit various body parts of a target user.

Recently, a technology of recognizing the movement of the user's fingers using an external camera has been introduced. However, when the user wears a tactile stimulation provision device in the form of a glove, it is not easy to recognize the movement of the user's fingers due to the thickness of the glove filled with electronic components. In addition, as the thickness of the glove increases, the movement of the fingers becomes difficult.

DISCLOSURE

Technical Problem

The present invention is directed to providing a tactile stimulation provision device in the form of a glove, which may be in close contact with a user's finger to make the movement of the fingers less difficult and increase a finger motion recognition rate using an external camera.

Technical Solution

A tactile stimulation provision device in the form of a glove according to one embodiment of the present invention includes a first fabric in the form of a glove, a second fabric having a shape covering a hand back portion and finger upper portions of the first fabric, the shape covering from the finger upper portions to fingerprint portions of the first fabric by extending, fixing patches covering fingerprint portions of the second fabric and having first openings, and actuators inserted into the first openings and fixed between the fixing patches and the second fabric.

The tactile stimulation provision device may further include first overlapping patches overlapping the fixing patches and a portion of the second fabric, and second overlapping patches overlapping the fixing patches, another portion of the second fabric, and the first overlapping patches.

The tactile stimulation provision device may further include a third fabric covering a hand back portion of the second fabric and including a second opening.

The tactile stimulation provision device may further include a first circuit unit inserted into the second opening and positioned between the third fabric and the second fabric, and driving lines electrically connecting the first circuit unit to the actuators.

The driving lines may pass through a space between the third fabric and the second fabric, pass through a space between the second fabric, the first overlapping patches, and the second overlapping patches, and pass through the first openings.

The third fabric may further include a third opening, and the tactile stimulation provision device may further include a bottom case inserted into the third opening and positioned between the third fabric and the first fabric, and a second circuit unit supported by the bottom case and electrically connected to the first circuit unit.

The first fabric may further include a fourth opening, a partial edge of the fourth opening may be positioned between a portion of the bottom case and a portion of the second circuit unit, and the tactile stimulation provision device may further include a top case coupled to the bottom case while pressing the first fabric.

The tactile stimulation provision device may further include a battery positioned between the second circuit unit and the bottom case.

The tactile stimulation provision device may further include a battery inserted into the third opening and positioned between the third fabric and the first fabric, and a power line electrically connecting the battery to the second circuit unit.

The tactile stimulation provision device may further include stretchable sensors positioned to overlap finger upper portions of the second fabric.

The tactile stimulation provision device may further include a stretchable sensor positioned to overlap a hand back portion, finger upper portions, and fingerprint portions of the second fabric.

Advantageous Effects

Since a tactile stimulation provision device according to the present invention can be in close contact with a user's fingers, it is possible to make the movement of the fingers less difficult and increase a finger motion recognition rate using an external camera.

MODES OF THE INVENTION

Figure 1:
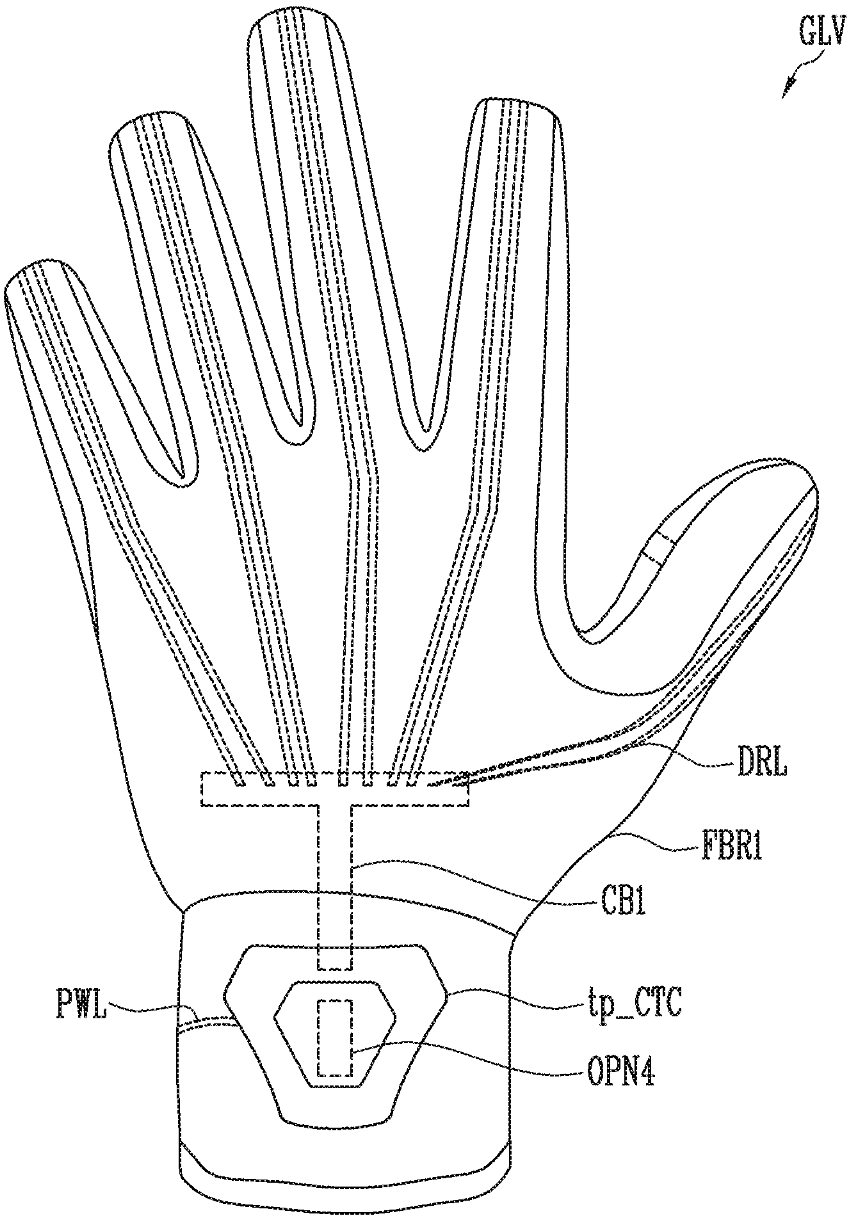
FIG. 1 is a view for describing a hand back portion of a tactile stimulation provision device according to one embodiment of the present invention.

Hereinafter, various embodiments of the present invention will be described in detail with reference to the accompanying drawings so that those skilled in the art to which the present invention pertains can easily carry out the present invention. The present invention may be implemented in various different forms and is not limited to the embodiments described herein.

To clearly describe the present invention, parts not related to the description have been omitted, and the same or similar components are denoted by the same reference numerals throughout the specification. Therefore, the above-described reference numerals can be used in other drawings.

In addition, since the size and thickness of each component illustrated in the drawings are arbitrarily illustrated for convenience of description, the present invention is not necessarily limited to the illustrated ones. To clearly express various layers and areas in the drawings, the thickness can be exaggeratedly illustrated.

Figure 2:
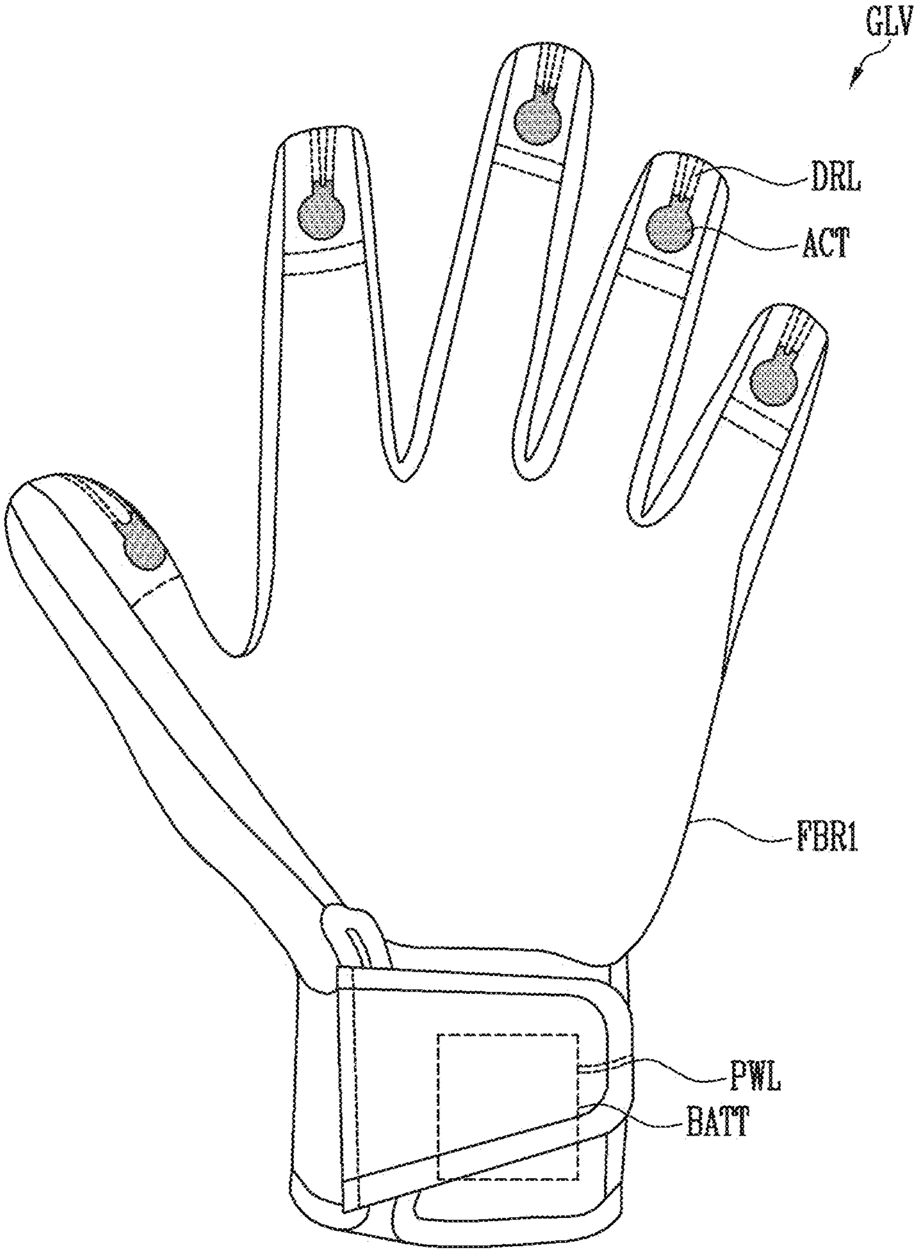
FIG. 2 is a view for describing a palm portion of the tactile stimulation provision device according to the one embodiment of the present invention.

FIG. 1 is a view for describing a hand back portion of a tactile stimulation provision device according to one embodiment of the present invention. FIG. 2 is a view for describing a palm portion of the tactile stimulation provision device according to the one embodiment of the present invention.

Referring to FIGS. 1 and 2, a tactile stimulation provision device GLV according to one embodiment of the present invention is a glove-shaped tactile stimulation provision device GLV and may include a first fabric FBR1, driving lines DRL, a first circuit unit CB1, actuators ACT, a top case tp_CTC of a controller case, a power line PWL, and a battery BATT.

FIG. 1 illustrates an exterior of the tactile stimulation provision device GLV worn on a left hand when viewed the hand back portion, and FIG. 2 illustrates the exterior of the tactile stimulation provision device GLV worn on the left hand when viewed the palm portion. Since the contents to be described below can be applied to the tactile stimulation device worn on a right hand in the same manner, overlapping description will be omitted.

The first fabric FBR1 may have the form of a glove. The first fabric FBR1 may be a fabric positioned at the outermost side of the tactile stimulation provision device GLV. Hereinafter, in describing a specific fabric, the corresponding fabric is not necessarily limited to being formed of only a fabric and includes a case of being formed of two or more fabrics to facilitate a manufacturing process or improve functionality. In addition, the two or more fabrics do not always have to be made of the same material.

The palm portion of the first fabric FBR1 may be made of a mesh material. Since the user's palm is a body part which sweats a lot, ventilation can be facilitated by adopting the first fabric FBR1 made of a mesh material. In addition, the hand back portion of the first fabric FBR1 may be made of the same material (e.g., a mesh material) as the palm portion. To recognize the user's hand by an external camera, it is desirable for an exterior of the tactile stimulation provision device GLV to be seamless. When a wrist portion is compared to the hand back portion and the palm portion, the wrist portion of the first fabric FBR1 may be made of a relatively dense material (e.g., a leather material). Since the wrist portion of the first fabric FBR1 has a relatively small contribution to camera recognition and should support relatively heavy electronic components (e.g., the battery BATT) and be water resistant, the wrist portion is preferably made of a dense material. An upper portion of the wrist of the first fabric FBR1 may include a fourth opening OPN4. The fourth opening OPN4 will be described below with reference to FIGS. 6A, 6B, and 7.

The top case tp_CTC may be positioned on the upper portion of the wrist of the first fabric FBR1. The top case tp_CTC is a controller case and may be assembled together with a bottom case bt_CTC to support and protect an internal second circuit unit CB2 (see FIGS. 6A, 6B, and 7). The top case tp_CTC and the bottom case bt_CTC may be made of a rigid material (e.g., plastic). The second circuit unit CB2 is a main controller and may be implemented as a printed circuit board (PCB). The second circuit unit CB2 may adjust the actuators ACT through wired and wireless communication with an external device. In addition, when stretchable sensors SS1 and SS2 are added, the second circuit unit CB2 may be configured to read data from the stretchable sensors SS1 and SS2 and transmit the data to the outside (see FIGS. 8 to 10).

The battery BATT may be electrically connected to the second circuit unit CB2 through the power line PWL. The battery BATT may supply necessary power to the second circuit unit CB2 through the power line PWL. The battery BATT may be positioned on an inner surface of a lower portion of the wrist of the first fabric FBR1. The wrist is a body part with relatively small movement, and considering convenience of operation, it is preferable that the center of gravity of the tactile stimulation provision device GLV be in the lower portion of the wrist. The battery BATT may be a general rigid battery or a battery made of a flexible material (e.g., a flexible battery). When the flexible battery is adopted, the battery BATT may be smoothly bent according to a shape of the wrist, thereby further improving the user's feeling during wearing.

The first circuit unit CB1 may be electrically connected to the actuators ACT through the driving lines DRL. The first circuit unit CB1 may be formed of a flexible PCB (FPCB). It is not preferable to directly connect the driving lines DRL to the second circuit unit CB2 because a connection portion with a large volume is required. Therefore, the first circuit unit CB1 serves as a connection medium between the driving lines DRL and the second circuit unit CB2 and is positioned on the hand back portion which is a portion of the glove that is less prone to distortion. Since the free movement of the user's fingers should be ensured, the first circuit unit CB1 does not extend to a finger portion. The tactile stimulation provision device GLV may further include Velcro on one surface of the first circuit unit CB1, and the first circuit unit CB1 may be fixed to a fabric (e.g., a second fabric FBR2 or third fabric FBR3) through the Velcro, thereby preventing the first circuit unit CB1 from escaping from its position (see FIG. 4).

The actuators ACT may be positioned on inner surfaces of fingerprint portions of the first fabric FBR1. The actuators ACT may provide tactile stimulation according to a control signal of the second circuit unit CB2 transmitted to the driving lines DRL. For example, conventional motors such as an eccentric rotating mass (ERM), a linear resonance actuator (LRA), a piezoelectric actuator, and a voice-coil can be used as the actuators ACT. Meanwhile, electrical stimulation using an electrical stimulation actuator and temperature transfer using a Peltier actuator can be used as the tactile stimulation. In addition, various actuators, such as a tactile stimulation actuator using air and liquid and a tactile stimulation actuator using sound waves, can be used as the actuators ACT.

Figure 3:
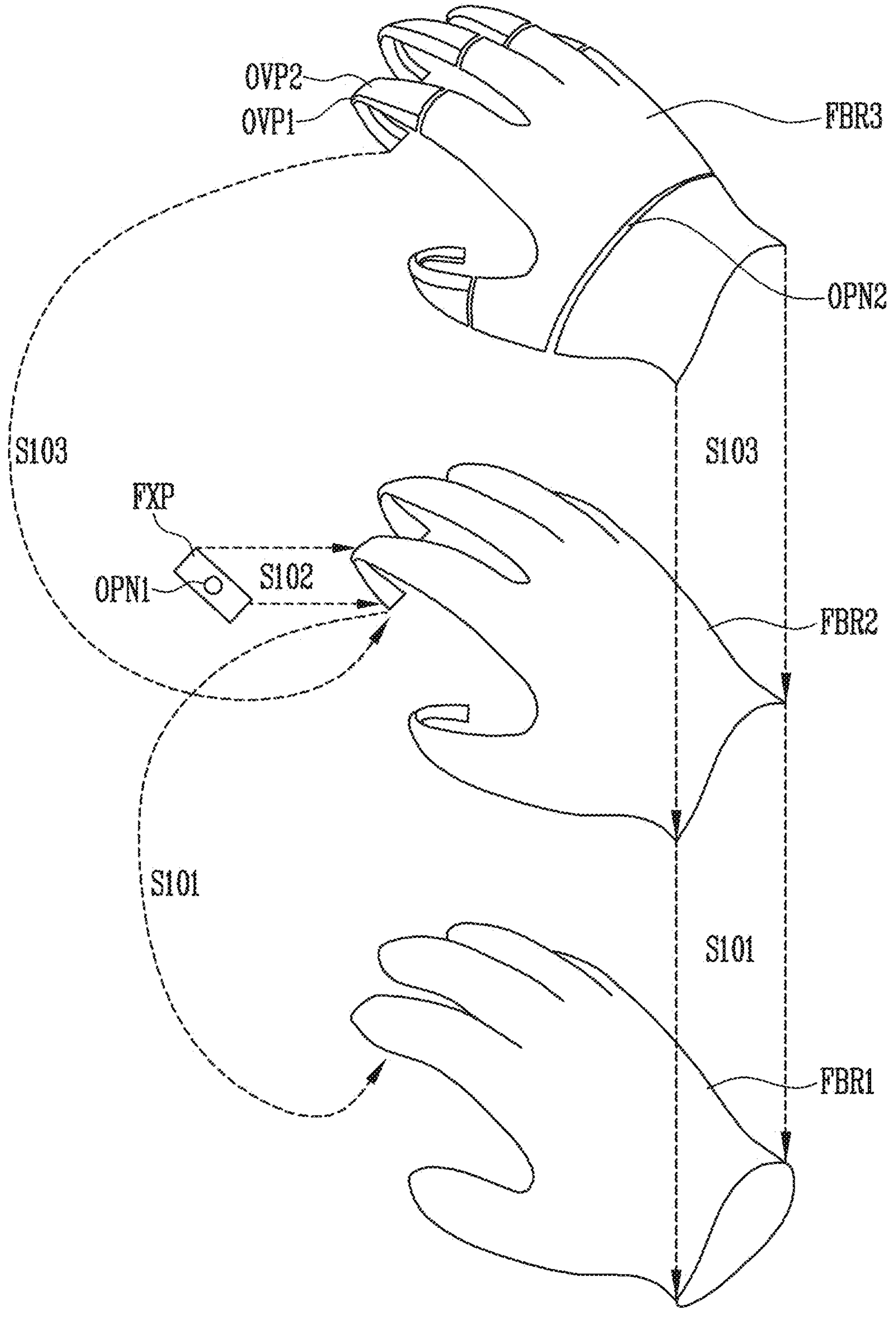
FIGS. 3 and 4 are views for describing a method of manufacturing the tactile stimulation provision device according to the one embodiment of the present invention.
Figure 4:
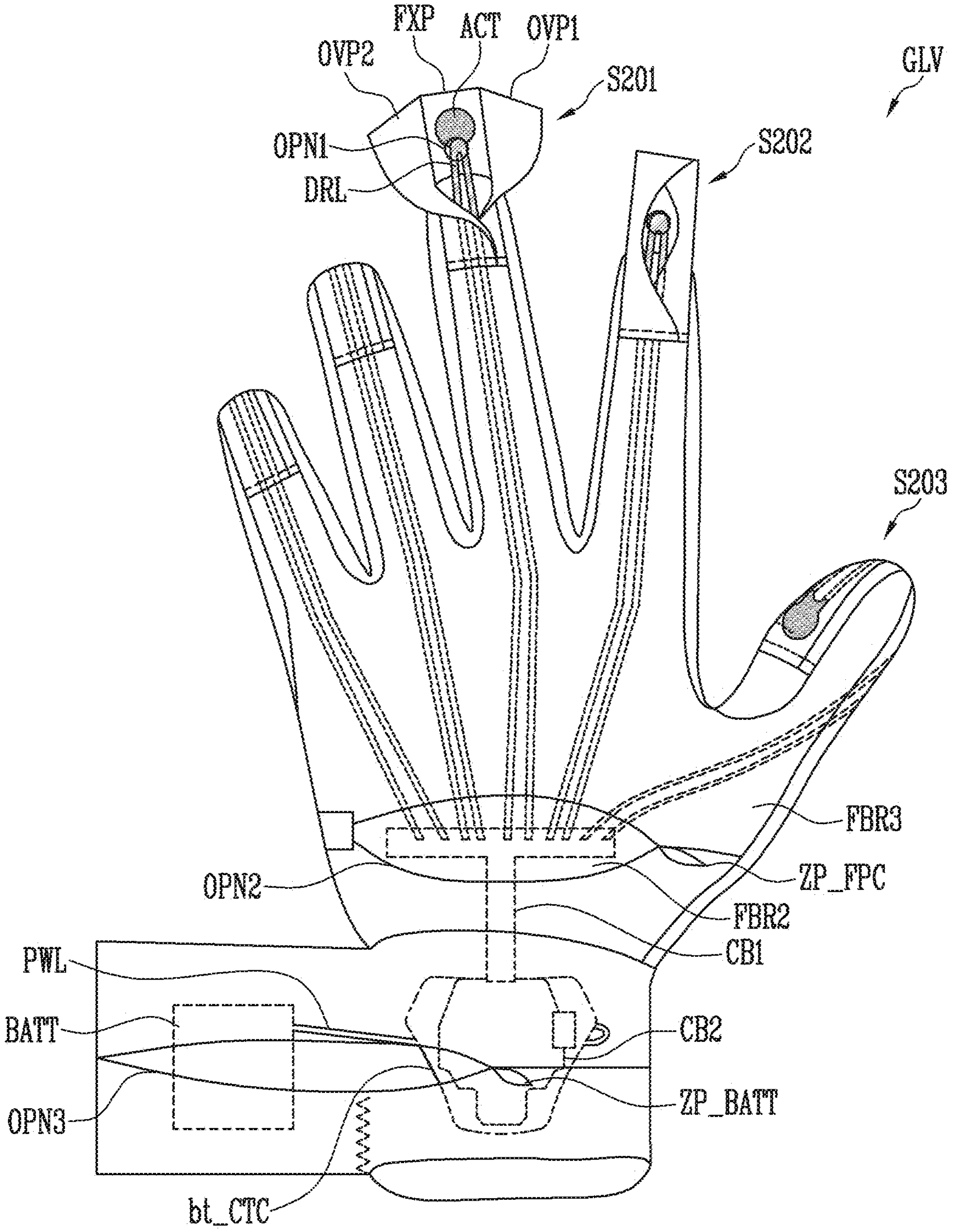

FIGS. 3 and 4 are views for describing a method of manufacturing the tactile stimulation provision device according to the one embodiment of the present invention.

FIGS. 3 and 4 illustrate a state in which the tactile stimulation provision device GLV is turned inside out. Therefore, the first fabric FBR1 is positioned at the innermost side, and the third fabric FBR3 is positioned at the outermost side. A method of coupling (e.g., sewing) the fabrics FBR1, FBR2, FBR3, FXP, OVP1, and OVP2 will be described with reference to FIG. 3. Thereafter, a method of fixedly inserting the electronic components CB1, ACT, DRL, BATT, CB2, and PWL into the coupled fabrics FBR1, FBR2, FBR3, FXP, OVP1, and OVP2 will be described with reference to FIG. 4. According to the present embodiment, since the sewing of the fabrics FBR1, FBR2, FBR3, FXP, OVP1, and OVP2 and the inserting of the electronic components CB1, ACT, DRL, BATT, CB2, and PWL are separated, the sewing can be automated in a factory, thereby increasing manufacturing efficiency. When the electronic components should be inserted during the sewing, it is difficult to automate the sewing due to the volumes of the electronic components, and the electronic components may have a problem such as wire disconnection.

Referring to FIG. 3, the second fabric FBR2 may cover the hand back portion and the finger upper portions of the first fabric FBR1 and have a covering shape extending from the finger upper portions to the fingerprint portions of the first fabric FBR1. As described above, it is preferable that the remaining surfaces of the first fabric FBR1 except for the wrist portion be made of a mesh material for camera recognition. In this case, the first circuit unit CB1, the driving lines DRL, and the actuators ACT may be visible externally, which is not preferable in terms of beauty, and may be vulnerable to dust or liquid. Therefore, by coupling the second fabric FBR2 to the first fabric FBR1 (S101), it is possible to enhance the aesthetic property and product protection of the tactile stimulation provision device GLV. The second fabric FBR2 may be formed of a fabric with a water resistant and dustproof function, a general solid fabric, or a fabric made of the same mesh material as the first fabric FBR1.

Next, fixing patches FXP may be coupled to overlap the fingerprint portions of the second fabric FBR2 (S102). In an embodiment, the fixing patches FXP may be coupled to the second fabric FBR2 or the first fabric FBR1.

The fixing patches FXP may cover the fingerprint portions of the second fabric FBR2 and have first openings OPN1. In FIG. 3, although only one fixing patch FXP is illustrated for convenience of description, five fixing patches FXP are required for each glove according to the number of fingers. To prevent the actuator ACT from escaping unintentionally, a diameter of the first opening OPN1 may be smaller than a diameter of the actuator ACT. The fixing patches FXP may be made of a stretchable material.

Next, first overlapping patches OVP1, second overlapping patches OVP2, and the third fabric FBR3 may be coupled to the second fabric FBR2 or the first fabric FBR1 (S103).

The first overlapping patches OVP1 may overlap the fixing patches FXP and a portion of the second fabric FBR2. The second overlapping patches OVP2 may overlap the fixing patches FXP, another portion of the second fabric FBR2, and the first overlapping patches OVP1. Portions of the first overlapping patches OVP1 and the second overlapping patches OVP2 may be positioned to overlap each other and positioned to cover fingernail portions and fingerprint portions of the second fabric FBR2. In this case, the overlapping portions of the first overlapping patch OVP1 and the second overlapping patch OVP2 are not coupled.

The third fabric FBR3 may cover the hand back portion of the second fabric FBR2 and include a second opening OPN2. As illustrated in FIG. 3, the third fabric FBR3 may be formed of two fabrics, and a space between the two fabrics may form the second opening OPN2.

Referring to FIG. 4, as a zipper ZP_FPC is added, edges of the two fabrics of the third fabric FBR3 may be coupled, and the second opening OPN2 may be formed in a closed-loop shape. Depending on whether the zipper ZP_FPC is closed, the opening and closing of the second opening OPN2 may be determined. Meanwhile, a wrist portion of the third fabric FBR3 may include a third opening OPN3. A zipper ZP_BATT may be added to one side of the third opening OPN3, and the opening and closing of the third opening OPN3 may be determined depending on whether the zipper ZP_BATT is closed. The third opening OPN3 helps the electronic components to be easily fixedly inserted, but is not an essential component. In other words, in another embodiment, even when there is no third opening OPN3, the electronic components may be fixedly inserted through only the second opening OPN2. Meanwhile, in still another embodiment, even when there is no second opening OPN2, the actuators ACT, the driving lines DRL, and the first circuit unit CB1 may be inserted through only the third opening OPN3.

In FIG. 4, an end portion of the third fabric FBR3 on which the battery BATT is positioned is illustrated as being unfolded for the purpose of description and when a product is implemented, may be positioned to overlap the lower portion of the wrist of the first fabric FBR1 (see FIG. 2). In addition, in FIG. 4, end portions of the first overlapping patch OVP1, the second overlapping patch OVP2, and the fixing patch FXP are illustrated as being unfolded for the purpose of description, and when the product is implemented, the corresponding end portions are in a state of being already coupled to the first fabric FBR1 or the second fabric FBR2 (see operation S103 of FIG. 3).

First, the first circuit unit CB1 and the actuators ACT may be connected through the driving lines DRL. For example, one ends of the driving lines DRL may be soldered to the first circuit unit CB1, and the other ends of the driving lines DRL may be soldered to the actuators ACT.

Next, the actuators ACT, the driving lines DRL, and the first circuit unit CB1 may be inserted into the second opening OPN2. Therefore, the first circuit unit CB1 may be positioned between the third fabric FBR3 and the second fabric FBR2.

Next, manufacturers may allow each of the actuators ACT and the driving lines DRL to pass through a space between the third fabric FBR3 and the second fabric FBR2 of the corresponding finger portion. In this case, the first overlapping patch OVP1 and the second overlapping patch OVP2 may be in a state of being spaced apart from each other. Therefore, the manufacturers may easily take the actuator ACT out through a gap between the first overlapping patch OVP1 and the second overlapping patch OVP2 (S201).

Since the first opening OPN1 of the fixing patch FXP is in a state of being exposed through the gap between the first overlapping patch OVP1 and the second overlapping patch OVP2, the actuator ACT may be inserted into the first opening OPN1 and fixed between the fixing patch FXP and the second fabric (e.g., the fingerprint portion) (S202 and S203). Since the fixing patch FXP is made of a stretchable material, the manufacturers may insert the actuator ACT with a relatively large diameter into the first opening OPN1 with a relatively small diameter. In addition, when the user's fingers are inserted into the tactile stimulation provision device GLV, the fixing patch FXP becomes tight, and thus the actuator ACT may be in close contact with the fingerprint portion of the user's finger. Therefore, according to the present embodiment, it is possible to implement a tactile stimulation provision device GLV which can have the reduced volume and does not have the feeling of irritation by not using a coupling material such as Velcro and be in close contact with the user's fingers to provide detailed tactile stimulation.

The driving lines DRL are disposed in the form of passing through the space between the third fabric FBR3 and the second fabric FBR2, passing through a space between the second fabric FBR2, the first overlapping patches OVP1, and the second overlapping patches OVP2, and passing through the first openings OPN1.

Next, the second circuit unit CB2 and the battery BATT may be connected to the power line PWL, and the second circuit unit CB2, the battery BATT, and the power line PWL may be connected to the third opening OPN3. The second circuit unit CB2 may be coupled to the first circuit unit CB1 and electrically connected to the first circuit unit CB1.

In addition, the bottom case bt_CTC may be inserted into the third opening OPN3 and positioned between the third fabric FBR3 and the first fabric FBR1. Thereafter, the bottom case bt_CTC may be coupled to the top case tp_CTC to support the second circuit unit CB2. After the insertion of the electronic components is finished, the zipper ZP_FPC and ZP_BATT are in a state of being closed to tightly fix the electronic components.

Figure 5:
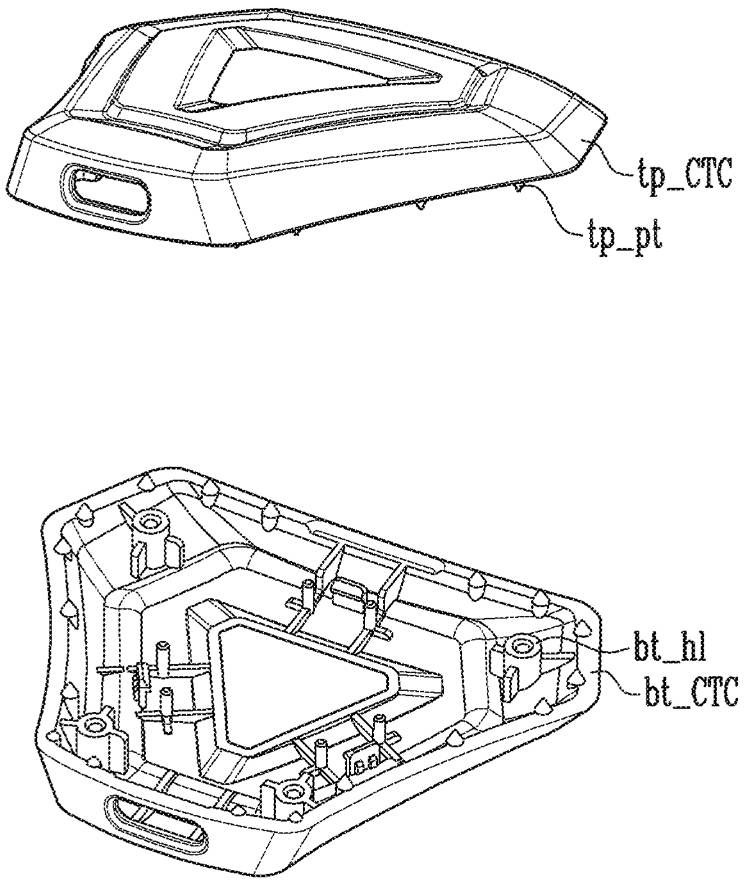
FIGS. 5 to 7 are views for describing a controller case of the tactile stimulation provision device according to the one embodiment of the present invention.
Figure 6A:
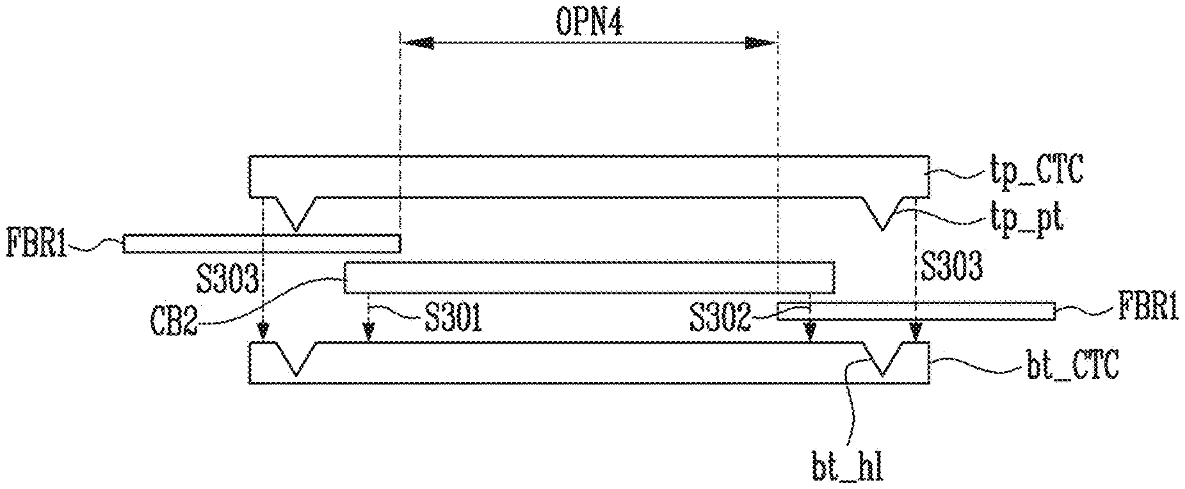
Figure 6B:
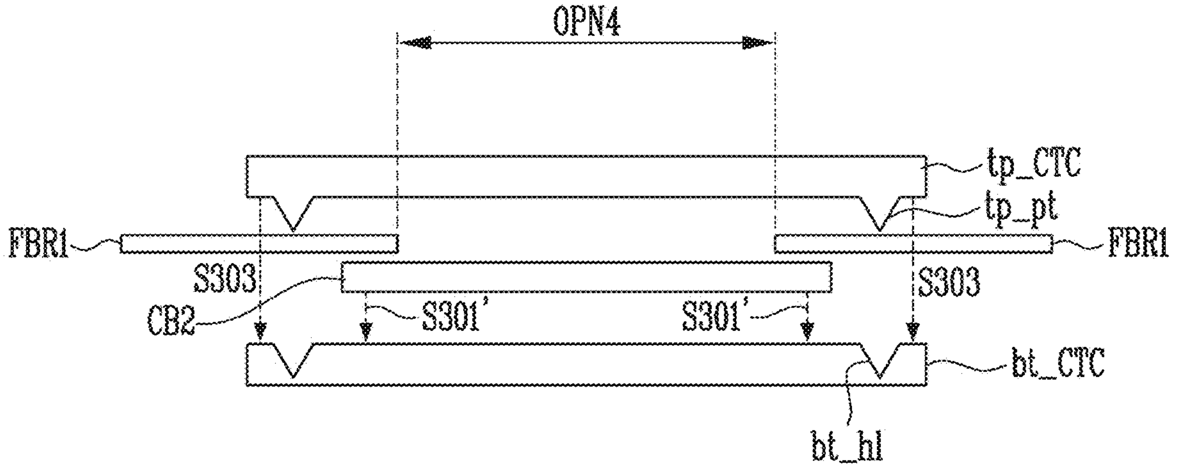
Figure 7:
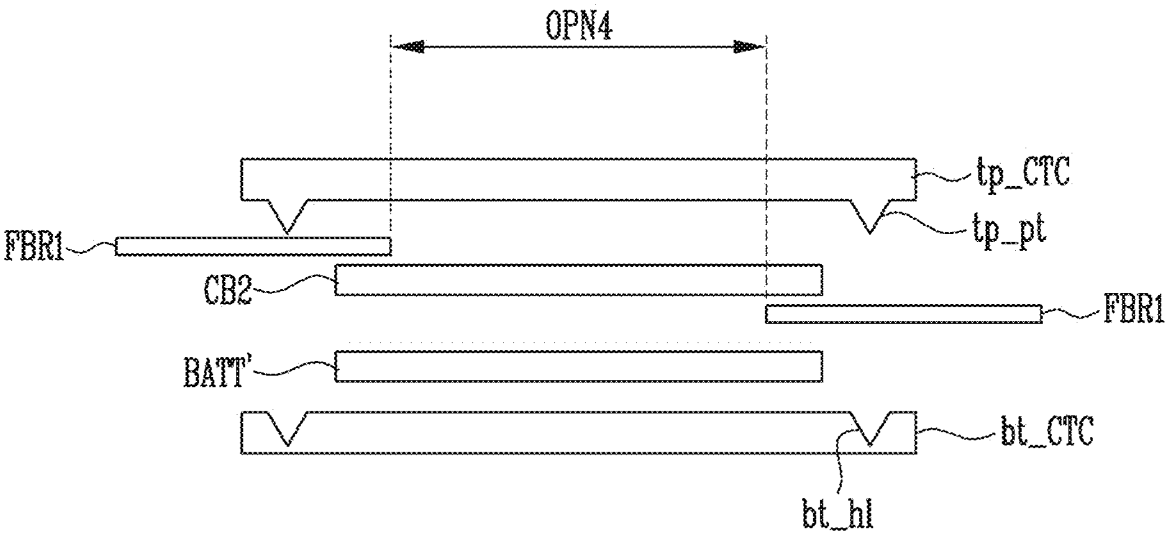

FIGS. 5 to 7 are views for describing a controller case of the tactile stimulation provision device according to the one embodiment of the present invention.

Referring to FIG. 5, the controller case may include the top case tp_CTC and the bottom case bt_CTC. For example, the top case tp_CTC may include protrusions tp_pt, and the bottom case bt_CTC may include protrusion accommodating holes bt_hl corresponding to the protrusions tp_pt. Meanwhile, the bottom case bt_CTC may include protrusions, and the top case tp_CTC may include protrusion accommodating holes corresponding to the protrusions.

Referring to FIG. 6A, first, a portion of one side of the second circuit unit CB2 may be coupled to one side of the bottom case bt_CTC (S301).

Next, a portion of the other side of the second circuit unit CB2 may be coupled to the other side of the bottom case bt_CTC. In this case, a partial edge (portion of the first fabric FBR1) of the fourth opening OPN4 may be positioned between the other side of the second circuit unit CB2 and the other side of the bottom case bt_CTC (S302). Therefore, when the second circuit unit CB2 and the bottom case bt_CTC are fully coupled, the first fabric FBR1 may be interposed between the second circuit unit CB2 and the bottom case bt_CTC so that the positions of the second circuit unit CB2 and the bottom case bt_CTC may be primarily fixed.

Next, the top case tp_CTC may be coupled to the bottom case bt_CTC while pressing the first fabric FBR1 (S303). For example, the protrusions tp_pt of the top case tp_CTC may be coupled to the protrusion accommodating holes bt_hl of the bottom case bt_CTC while pressing the first fabric FBR1. Additionally, additional coupling using screws is possible in a direction from the bottom case bt_CTC to the top case tp_CTC through the third opening OPN3. Therefore, the positions of the controller case and the second circuit unit CB2 may be stably fixed.

Referring to another embodiment of FIG. 6B, operation S302 may be omitted. For example, when the one side of the second circuit unit CB2 is coupled to the one side of the bottom case bt_CTC, the other side of the second circuit unit CB2 may also be coupled to the other side of the bottom case bt_CTC (S301'). In the present embodiment, the partial edge of the fourth opening OPN4 is not positioned between the other side of the second circuit unit CB2 and the other side of the bottom case bt_CTC.

Referring to FIG. 7, in an embodiment which describes a battery differing from the battery BATT of FIG. 4, a battery BATT' may be positioned between the second circuit unit CB2 and the bottom case bt_CTC. According to the embodiment of FIG. 7, it is possible to better protect the battery BATT' and eliminate the feeling of irritation on the lower portion of the wrist.

Figure 8:
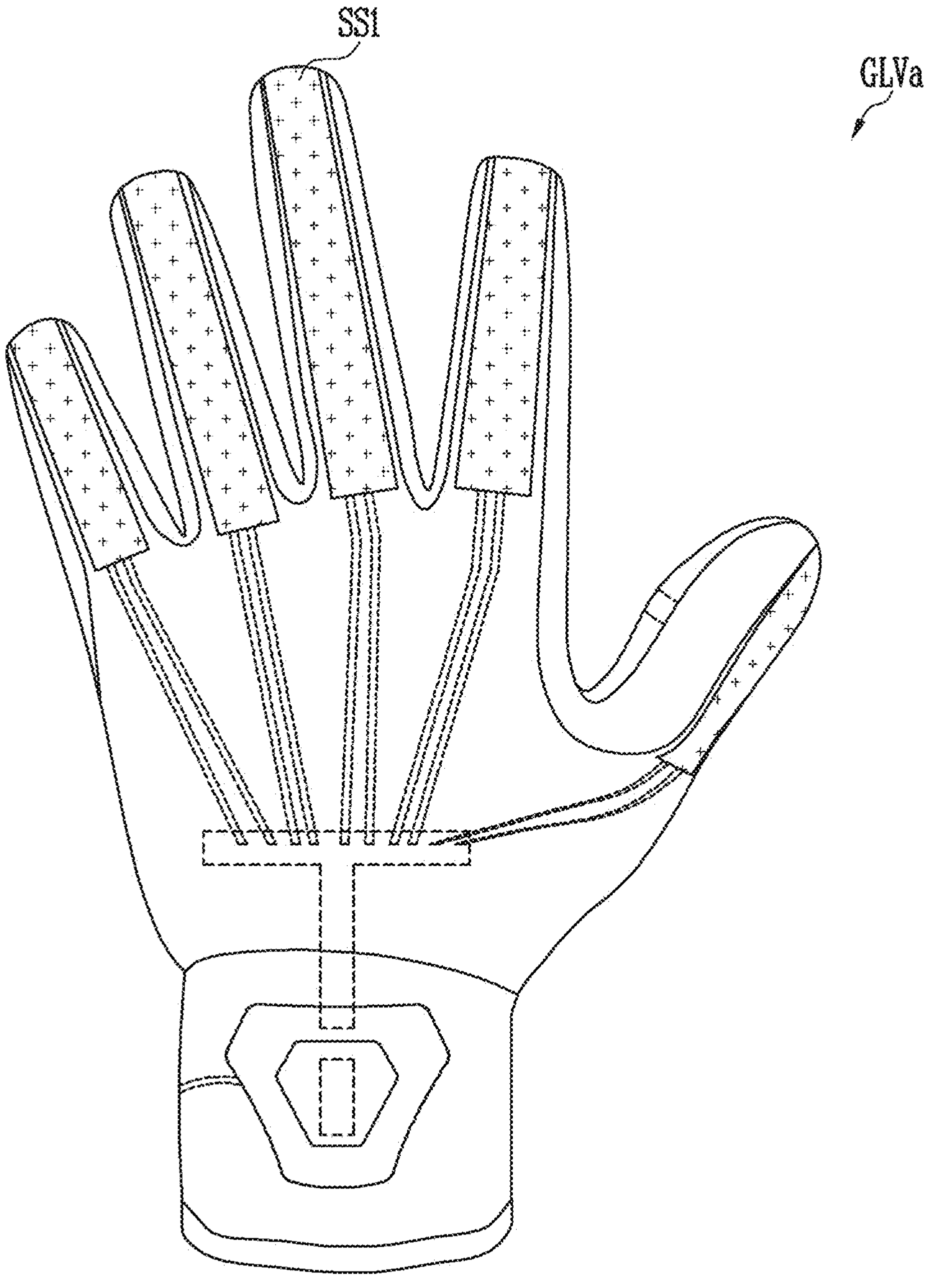
FIG. 8 is a view for describing a stretchable sensor according to one embodiment of the present invention.

FIG. 8 is a view for describing a stretchable sensor according to one embodiment of the present invention.

Referring to FIG. 8, the stretchable sensors SS1 may be positioned to overlap the finger upper portions of the second fabric FBR2. Since the stretchable sensors SS1 also need to be protected from dust or moisture, the stretchable sensors SS1 are preferably positioned between the second fabric FBR2 and the third fabric FBR3.

The stretchable sensors SS1 may generate sensing signals for an increase and decrease in length. For example, resistances of the stretchable sensors SS1 may be changed depending on an increase or decrease in length. The second circuit unit CB2 may transmit the sensing signals received from the stretchable sensors SS1 to the outside. Therefore, the tactile stimulation provision device GLV according to the present embodiment can not only provide tactile stimulation but also detect a degree of bent finger.

Figure 9:
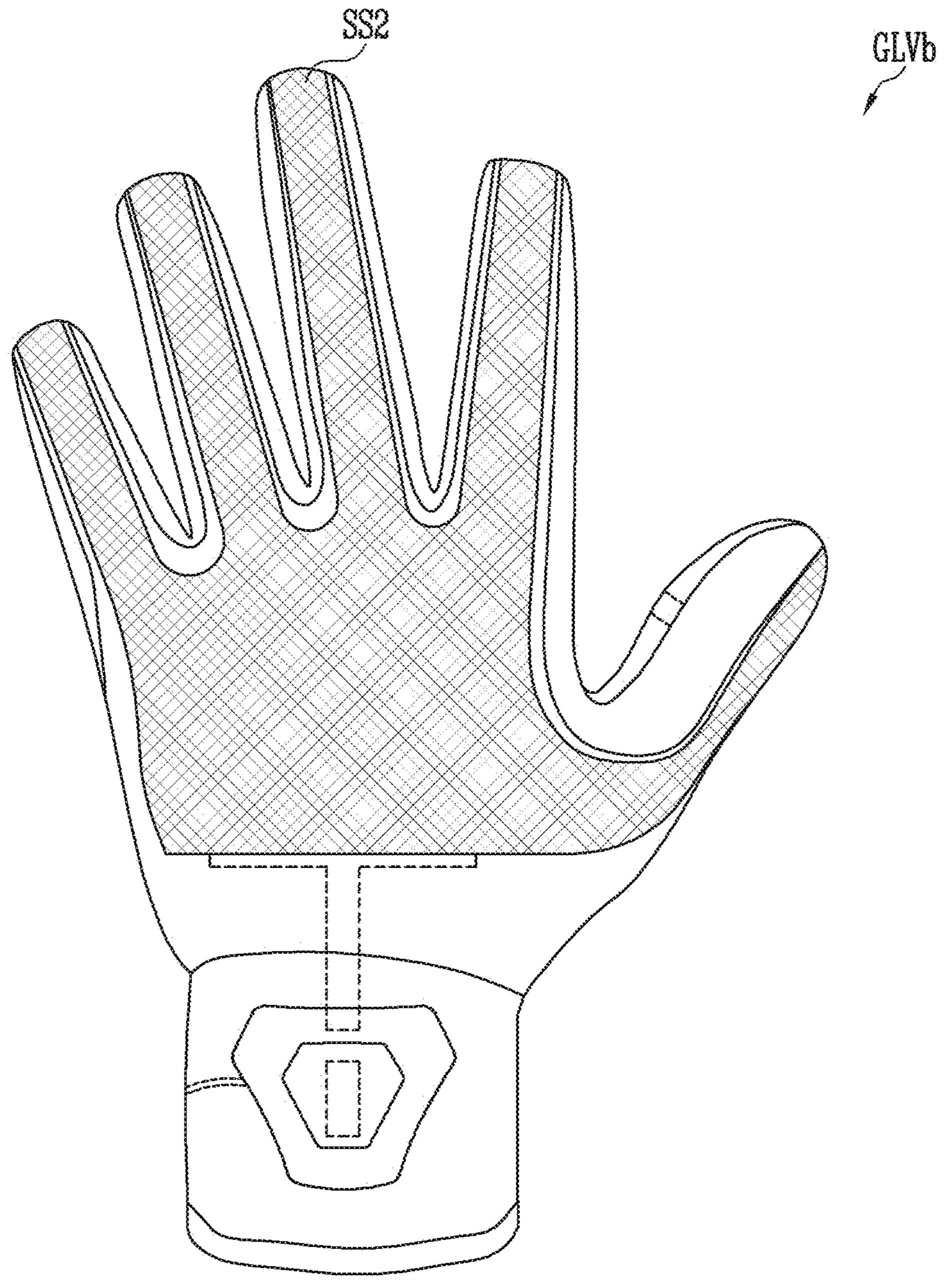
FIGS. 9 and 10 are views for describing a stretchable sensor according to another embodiment of the present invention.
Figure 10:
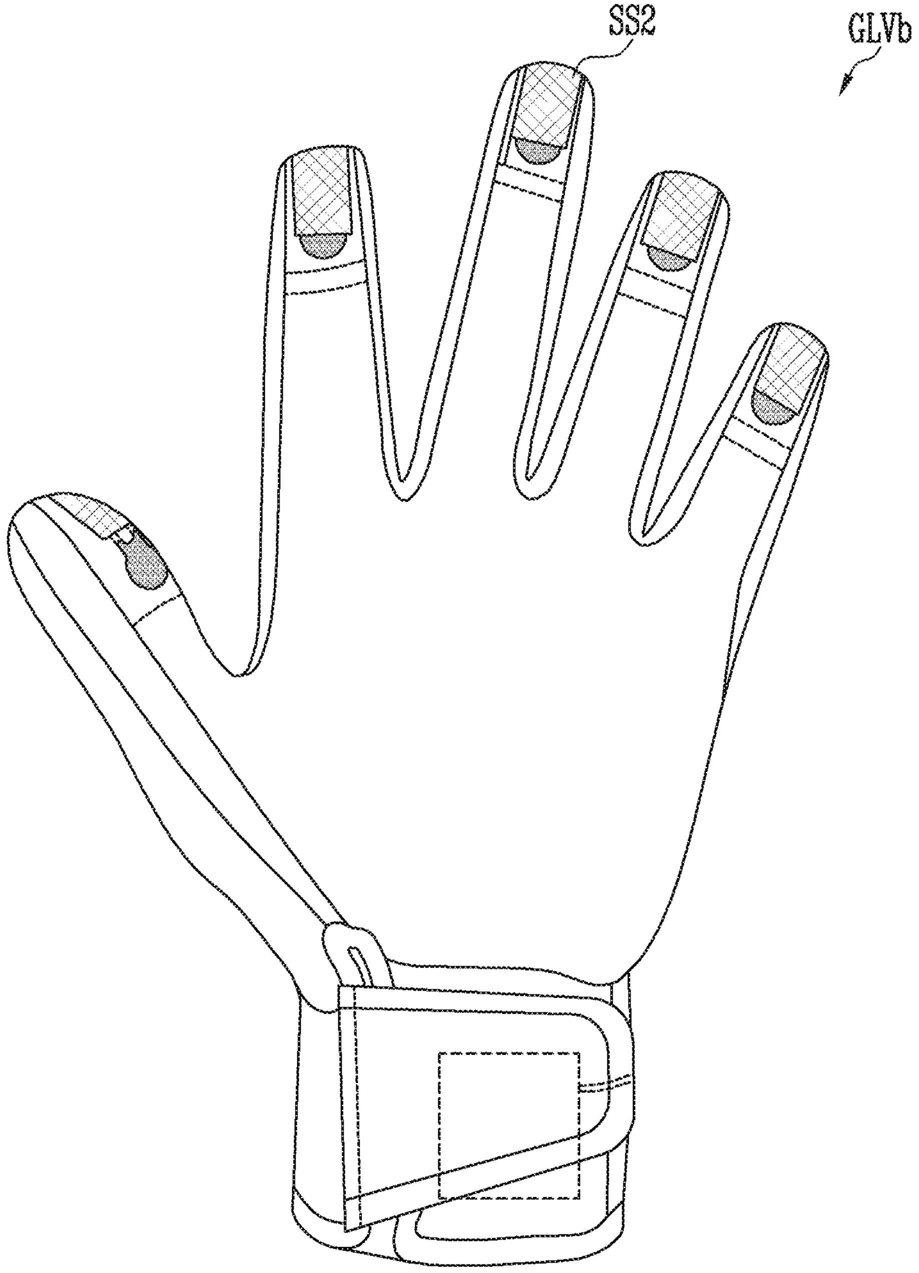

FIGS. 9 and 10 are views for describing a stretchable sensor according to another embodiment of the present invention.

Referring to FIGS. 9 and 10, the stretchable sensor SS2 may be positioned to overlap the hand back portion, finger upper portions, and fingerprint portions of the second fabric FBR2. According to the present embodiment, it is possible to measure a higher degree of freedom than when applied to the fingers.

Meanwhile, when the actuators ACT are configured as piezoelectric elements, the actuators ACT may provide tactile stimulation, but when pressure is applied, the actuators ACT may also serve as sensors due to the piezoelectric effect.

Meanwhile, a tracking module may be separately mounted above the controller case, in particular, the top case tp_CTC of the present invention, or the tracking module may be embedded into the controller case. The tracking module may provide three-dimensional coordinates (absolute position) of the user's hand in a current space so that the position of the user's hand may be recognized by an external fixed sensor. In implementing the tracking module, a technique such as an infrared or visible light sensor or an electromagnetic positioning sensor can be used.

Figure 11:
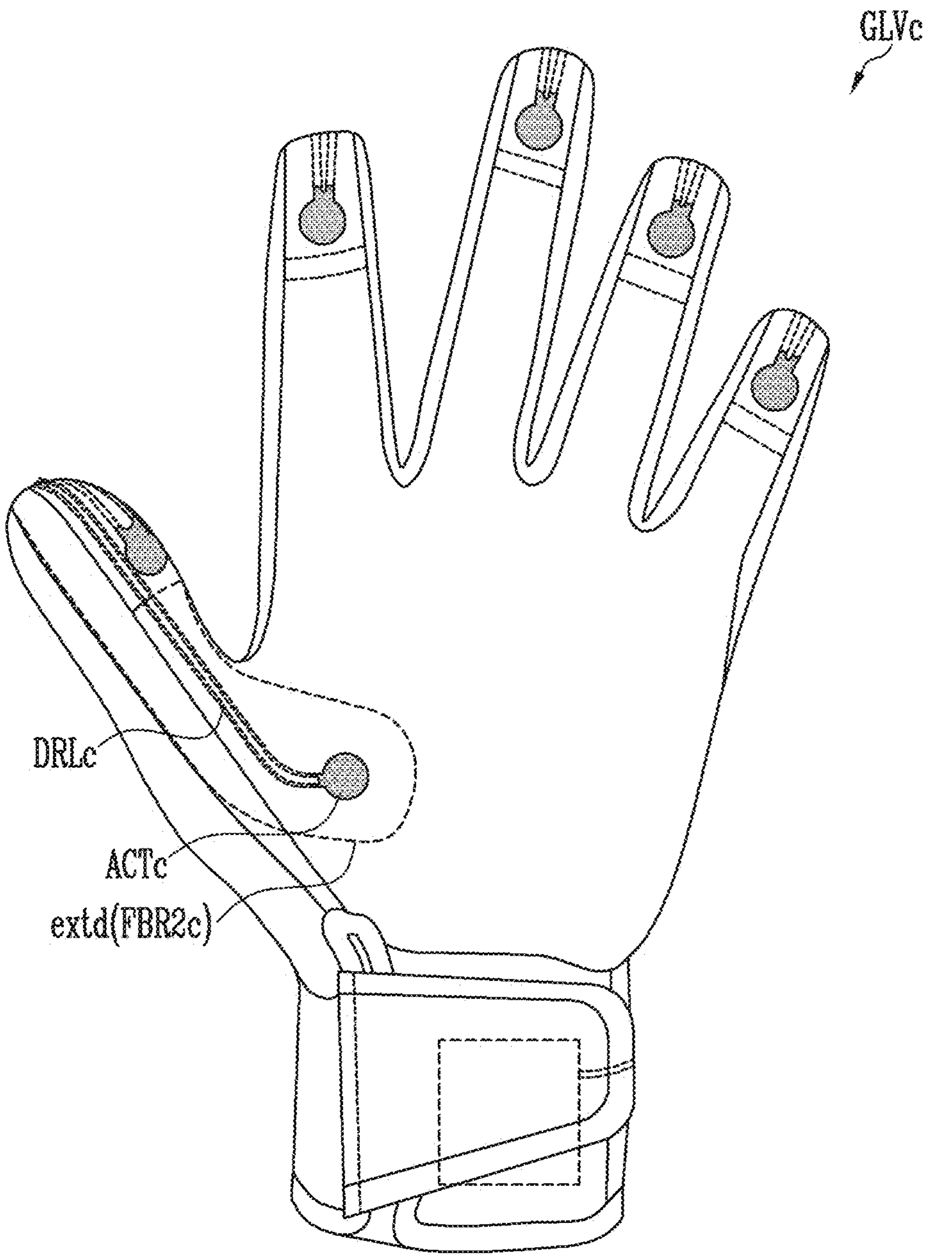
FIGS. 11 to 13 are views for describing a tactile stimulation provision device according to another embodiment of the present invention.
Figure 12:
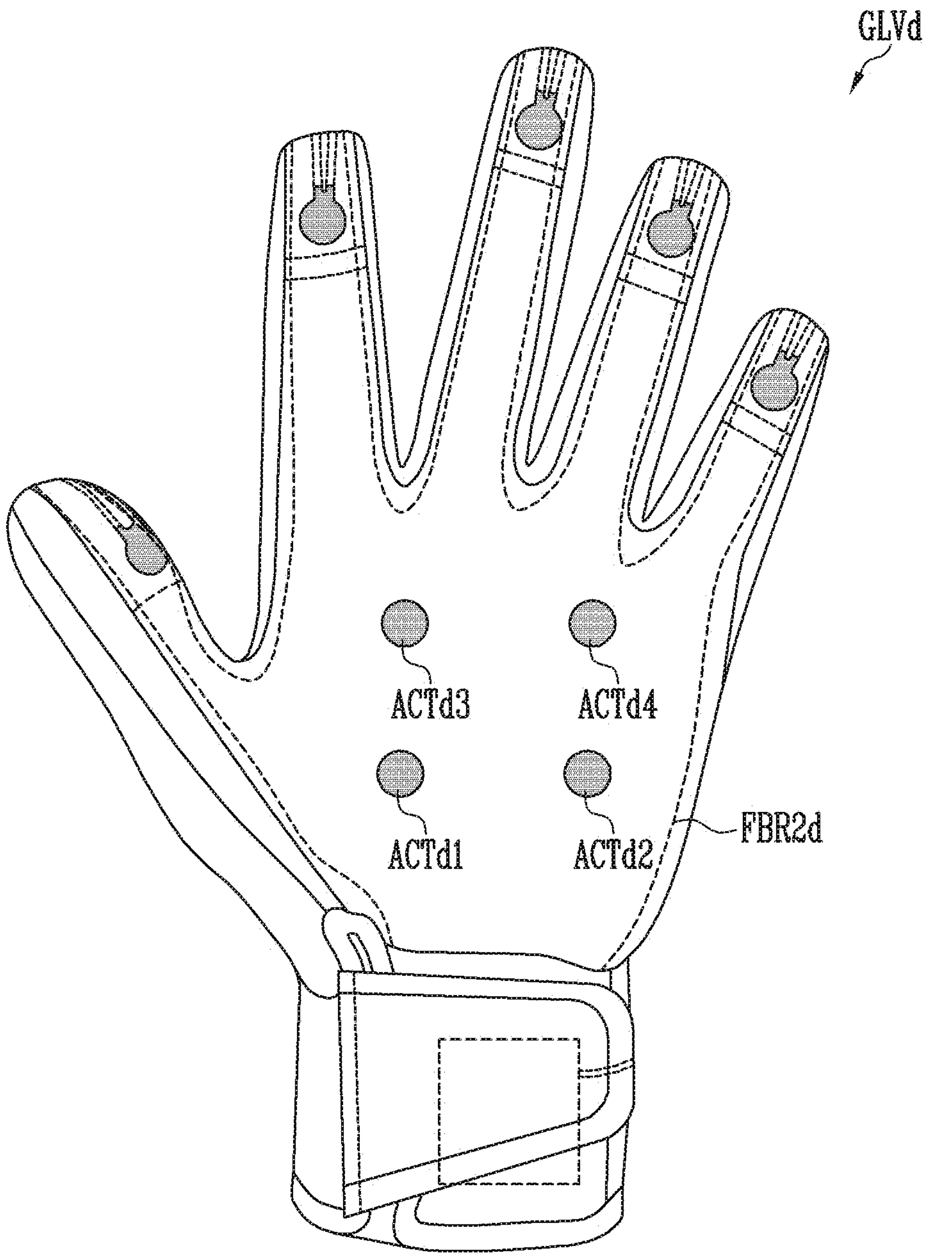
Figure 13:
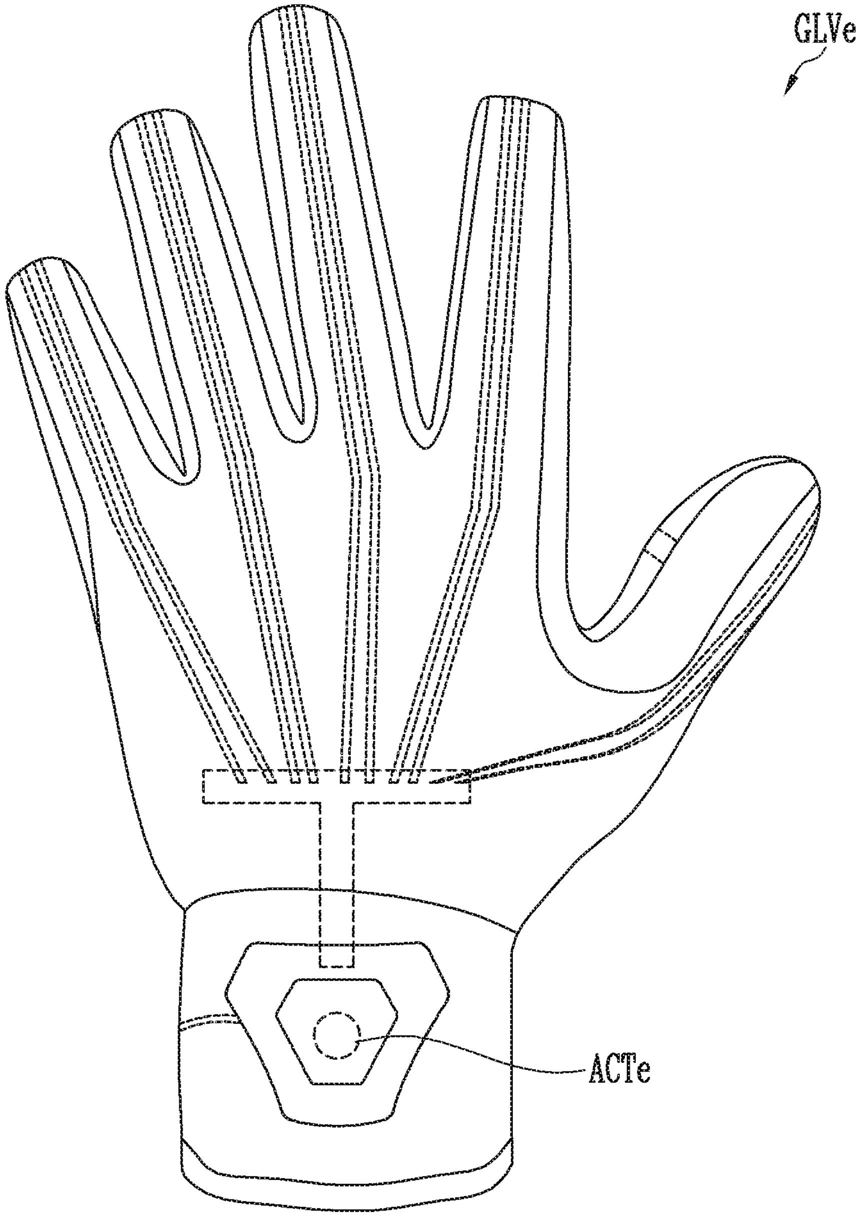

FIGS. 11 to 13 are views for describing a tactile stimulation provision device according to another embodiment of the present invention.

Referring to FIG. 11, a tactile stimulation provision device GLVc may further include an actuator ACTc. In this case, a second fabric FBR2*c* may have a shape in which a thumb portion extends to a palm portion. Since the actuator ACTc and driving lines DRLc connected to the actuator ACTc are covered by an extension extd of the second fabric FBR2*c*, the actuator ACTc and the driving lines DRLc may not be exposed to the outside by the first fabric FBR1 made of a mesh material.

According to the embodiment of FIG. 11, it is possible to minimize the feeling of irritation, secure ventilation, and provide tactile stimulation to a palm portion of the thumb which is frequently used by a user who picks up and manipulates an object.

Referring to FIG. 12, the tactile stimulation provision device GLVc may further include actuators ACTd1, ACTd2, ACTd3, and ACTd4. In this case, a second fabric FBR2*d* may include a palm portion. The palm portion of the second fabric FBR2*d* may have a shape extending from finger portions or extending from a wrist portion. Since the actuators ACTd1 to ACTd4 and driving lines connected to the actuators ACTd1 to ACTd4 are covered by the palm portion of the second fabric FBR2*d*, the actuators ACTd1 to ACTd4 and the driving lines may not be exposed to the outside by the first fabric FBR1 made of a mesh material.

According to the embodiment of FIG. 12, it is possible to provide tactile stimulation to most of the user's palm, thereby providing a great sense of immersion to the user.

Referring to FIG. 13, a tactile stimulation provision device GLVe may further include an actuator ACTe. The actuator ACTe may be attached to the controller case or attached to the second circuit unit CB2. According to the present embodiment, since there is no need for additional or extended fabric, there are no issues of ventilation and the feeling of irritation, and it is possible to easily provide tactile stimulation to the user's wrist.

The foregoing drawings and detailed description of the invention are merely illustrative of the present invention, which are used only to describe the present invention and are not used to limit the meaning or scope of the present invention described in the claims. Therefore, those skilled in the art will understand that various modifications and equivalent embodiments are possible from the present invention. Therefore, the true technical scope of the present invention should be determined by the technical spirit of the appended claims.

The invention claimed is:

1. A tactile stimulation provision device in a form of a glove, comprising:
- a first fabric in a form of a glove;
- a second fabric having a shape covering a hand back portion and finger upper portions of the first fabric, the shape covering from the finger upper portions to fingerprint portions of the first fabric by extending;
- fixing patches covering fingerprint portions of the second fabric and having first openings; and
- actuators inserted into the first openings and fixed between the fixing patches and the second fabric.

2. The tactile stimulation provision device of claim 1, further comprising:
- first overlapping patches overlapping the fixing patches and a portion of the second fabric; and
- second overlapping patches overlapping the fixing patches, another portion of the second fabric, and the first overlapping patches.

3. The tactile stimulation provision device of claim 2, further comprising a third fabric covering a hand back portion of the second fabric and including a second opening.

4. The tactile stimulation provision device of claim 3, further comprising:
- a first circuit unit inserted into the second opening and positioned between the third fabric and the second fabric; and
- driving lines electrically connecting the first circuit unit to the actuators.

5. The tactile stimulation provision device of claim 4, wherein the driving lines pass through a space between the third fabric and the second fabric, pass through a space between the second fabric, the first overlapping patches, and the second overlapping patches, and pass through the first openings.

6. The tactile stimulation provision device of claim 5, wherein the third fabric further includes a third opening, and
- the tactile stimulation provision device further includes:
- a bottom case inserted into the third opening and positioned between the third fabric and the first fabric; and
- a second circuit unit supported by the bottom case and electrically connected to the first circuit unit.

7. The tactile stimulation provision device of claim 6, wherein the first fabric further includes a fourth opening,
- a partial edge of the fourth opening is positioned between a portion of the bottom case and a portion of the second circuit unit, and
- the tactile stimulation provision device further includes a top case coupled to the bottom case while pressing the first fabric.

8. The tactile stimulation provision device of claim 7, further comprising a battery positioned between the second circuit unit and the bottom case.

9. The tactile stimulation provision device of claim 6, further comprising:
- a battery inserted into the third opening and positioned between the third fabric and the first fabric; and
- a power line electrically connecting the battery to the second circuit unit.

10. The tactile stimulation provision device of claim 1, further comprising stretchable sensors positioned to overlap finger upper portions of the second fabric.

11. The tactile stimulation provision device of claim 1, further comprising a stretchable sensor positioned to overlap a hand back portion, finger upper portions, and fingerprint portions of the second fabric.

* * * * *